April 23, 1968 G. CREMER ETAL 3,379,242

TUNNEL FURNACE

Filed March 14, 1966 2 Sheets-Sheet 1

INVENTORS
Dr. Gottfried Cremer
Heinz Behrens
by Prasser + Prasser
attorneys

April 23, 1968 G. CREMER ETAL 3,379,242

TUNNEL FURNACE

Filed March 14, 1966 2 Sheets-Sheet 2

INVENTORS

Dr. Gottfried Cremer
Heinz Behrens by Fraser + Fraser

United States Patent Office 3,379,242

Patented Apr. 23, 1968

1

2

3,379,242

TUNNEL FURNACE

Gottfried Cremer, 72 Kolner Str., 502 Frechen, near Cologne, Germany, and Heinz Behrens, 19 am Weidenpesch, 5022 Junkersdorf, Germany Filed Mar. 14, 1966, Ser. No. 533,999
2 Claims. (Cl. 165—120)

ABSTRACT OF THE DISCLOSURE

A tunnel furnace in which chambers are disposed above the furnace passage through which the material being fired travels. Within each chamber are vertically looped coils, one being disposed adjacent each side wall of the chamber and above a ledge bounding an aperture communicating with the furnace passage. The ledges prevent scale detachment from the cooling pipes from entering the furnace passage and damaging the material being fired.

Figure 1:
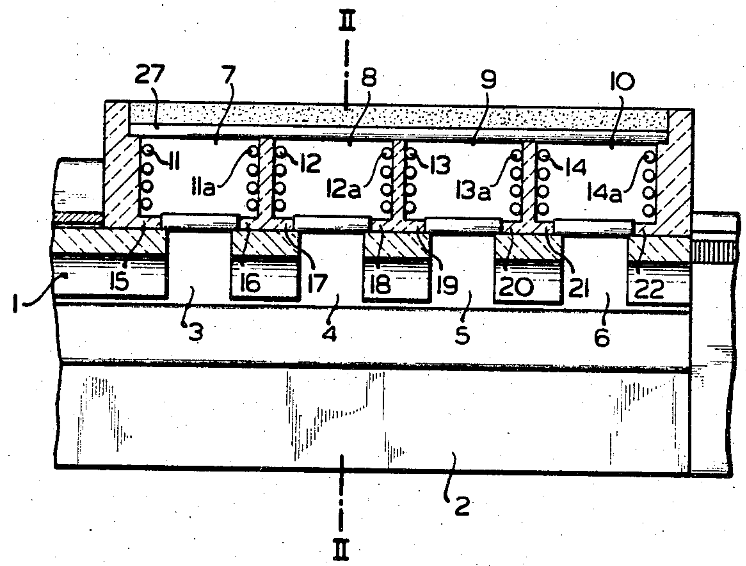

The invention relates to a tunnel furnace in which chambers are disposed above the furnace passage, communicates therewith via apertures in the passage roof and receive cooling means in the form of pipe coils.

Temperature distribution over the furnace cross-section can be controlled satisfactorily in this kind of tunnel furnace, since furnace atmosphere enters the chambers by convection, is cooled by the cooling means, then descends in the furnace fairly forcibly, thus ensuring an even temperature distribution over the whole cross-section.

In the known constructions, the cooling means are so disposed, preferably severally one above another, in the chambers that the surface of all the cooling coils, where the same are not in overlapping relationship with one another, is in free radiation-exchanging relationship with the material which is being fired and which goes through the furnace passage on trucks or the like. This furnace design provides the expected great advantages so far as temperature distribution and cooling are concerned, but it is found in the course of time that the material being fired gets more and more damaged in a way and for a reason which at first seemed inexplicable. It has been found after lengthy experience and experiments that the damage is caused by surface breakaway from the cooling pipe surfaces due to aggressive furnace atmosphere. This state of affairs became particularly noticeable in the course of time when, after experiences in the firing of coarse ceramic wear have proved satisfactory, cooling of the kind described was used with fine ceramic wear.

The invention obviates or at least reduces the aforesaid disadvantages. To this end, the invention provides a tunnel furnace in which chambers are disposed above the furnace passage, communicate therewith via apertures in the passage roof a receive cooling means in the form of pipe coils wherein the pipes which form the cooling means are disposed above the masonry bounding the aperture in each chamber, are masked downwardly by such masonry, and are so disposed as to be able to be brought into a radiation-exchanging relationship with the material being fired. According to another feature of the invention, the cooling means take the form, transversely of the furnace longitudinal axis above the furnace roof arches, of vertical meandering coils.

As well as ensuring the scale detachment from the cooling pipes cannot damage the material being fired—for the reason that the pieces of scale cannot reach the material being fired at all—arranging the cooling means in accordance with the invention has advantages for the movements of the cooled furnace atmosphere, in that the atmosphere which has been cooled in the chambers descends with less eddying than previously, so that the material being fired cools more steadily than previously. Also, per given number of cooling pipes in a chamber, the invention provides better cooling by radiation than in the prior art.

Figure 2:
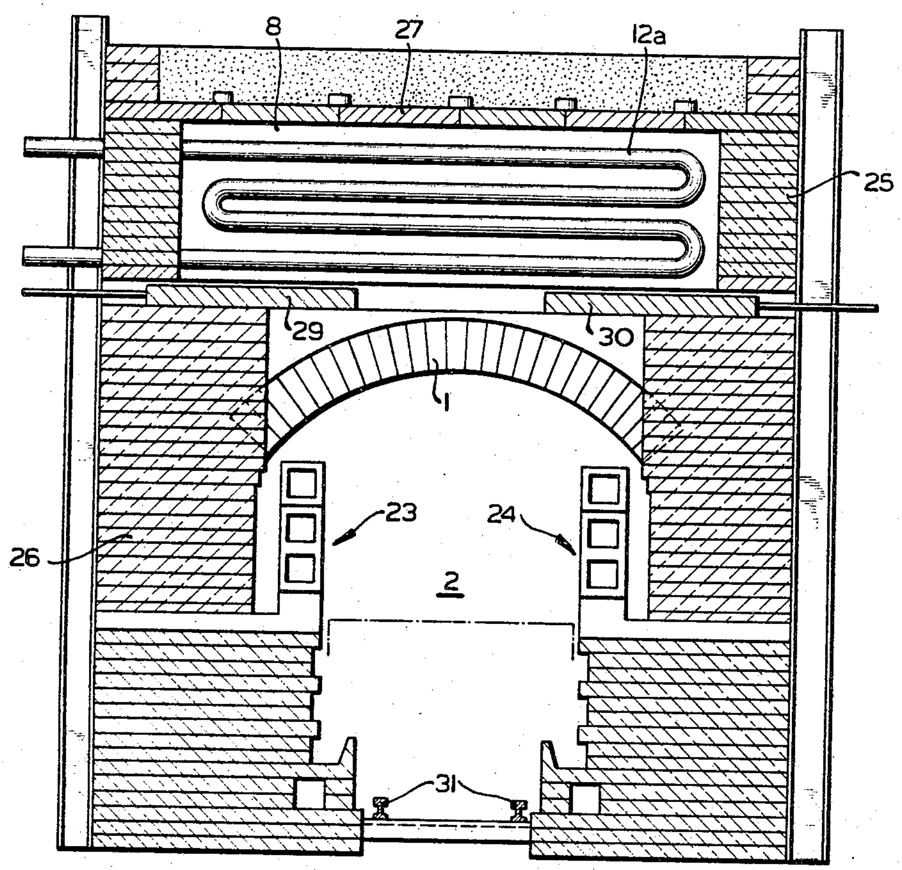
Figure 2:
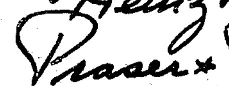

For a better understanding of the invention and to show how the same may be carried into effect, reference may now be made to the accompanying drawings wherein:

FIG. 1 is a longitudinal section through part of the cooling zone of a tunnel furnace, and FIG. 2 is a cross-section through the furnace along the line II—II of FIG. 1.

Referring to FIG. 1, a tunnel furnace has round arches 1 which are interrupted at places 3–6 to leave apertures communicating with chambers 7–10 above the furnace roof. Disposed in the chambers are cooling means 11, **11*a*, 12, 12*a*, 13, 13*a*, 14, 14*a* which, in accordance with the invention, are masked at places 15–22 by the masonry bounding the apertures 3–6**.

Referring now to FIG. 2, which is a section perpendicular to the furnace longitudinal axis, a tunnel furnace having, for instance, muffles 23, 24 has a passage 2 and a top portion 25 on furnace masory 26 to form the chambers 8, which are covered at the top by cover plates 27. Each chamber is in controllable communication with the interior of the passage 2 by way of dampers 29, 30. Disposed in the chamber 8 are the cooling coils which have been described in connection with FIG. 1 and whose precise arrangement can be gathered from the cooling coil **12*a* shown in FIG. 2. The coil 12*a* is of meandering form and extends substantially vertically above the remaining masonry of the arch 1**.

Rails 31 are provided for the trucks carrying the material being fired. FIG. 1 makes readily apparent that, per given number of cooling tubes in a chamber, cooling by radiation is better than in the prior art. Bearing in mind that two sets of cooling means each comprise 4 pipes which, in accordance with the invention, are disposed vertically on both sides of the chambers and not, as previously, horizontally one above another, it will be readily apparent that the overlapping of the two sets of cooling means diposed one above another as in the prior art would considerably reduce radiation effect.

What we claim is:

1. A tunnel furnace for firing ceramic material comprising:

a structure defining a furnace passage through which ceramic material being fired travels;

means providing a chamber above said passage, said means including a top wall, laterally spaced side walls, and a bottom wall having laterally spaced side ledges providing an intermediate aperture in communication with said furnace passage; and a vertically looped cooling pipe in said chamber and disposed adjacent a side wall and directly above and within the confines of a side ledge thereby to militate against scale detachment from said pipe from entering said furnace passage and damaging the ceramic material being fired, and wherein said cooling pipe is in radiation-exchanging relationship with said ceramic material.

2. A tunnel furnace as claimed in claim 1, comprising: a plurality of chambers above said furnace passage; and a similarly arranged vertically looped pipe adjacent each side ledge.

References Cited

UNITED STATES PATENTS

| | | | |
|---|---|---|---|
| 1,232,798 | 7/1917 | Heichert | 263—28 X |
| 1,635,861 | 7/1927 | Peiler | 263—28 X |
| 2,968,894 | 1/1961 | Hess | 165—120 X |
| 3,104,442 | 9/1963 | Cremer et al. | 263—28 X |

FOREIGN PATENTS

| | | |
|---|---|---|
| 1,177,062 | 8/1964 | Germany. |

ROBERT A. O'LEARY, *Primary Examiner.*

MEYER PERLIN, *Examiner.*

M. A. ANTONAKAS, *Assistant Examiner.*